(12) United States Patent
Gorobinskiy et al.

(10) Patent No.: US 7,883,806 B2
(45) Date of Patent: Feb. 8, 2011

(54) FUEL CELL REFORMING CATALYST, METHOD OF PREPARING THE SAME, REFORMER FOR FUEL CELL, AND FUEL CELL SYSTEM INCLUDING THE SAME

(75) Inventors: Leonid Gorobinskiy, Suwon-si (KR); Norboru Sato, Suwon-si (KR); Ju-Yong Kim, Suwon-si (KR); Myoung-Ki Min, Suwon-si (KR); Jin-Goo Ahn, Suwon-si (KR); Elena Alekseeva, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 12/380,163

(22) Filed: Feb. 23, 2009

(65) Prior Publication Data

US 2009/0214908 A1 Aug. 27, 2009

(30) Foreign Application Priority Data

Feb. 26, 2008 (KR) ...................... 10-2008-0017271

(51) Int. Cl.
*H01M 8/06* (2006.01)
*B01J 27/043* (2006.01)
*B01J 27/045* (2006.01)
*B01J 23/10* (2006.01)

(52) U.S. Cl. .................. 429/423; 502/222; 502/223; 502/304

(58) Field of Classification Search .............. 502/304, 502/302, 213, 222, 223; 429/423, 424, 425
See application file for complete search history.

(56) References Cited

U.S. PATENT DOCUMENTS

| | | | | |
|---|---|---|---|---|
| 4,283,308 A | * | 8/1981 | Ohara et al. | 502/213 |
| 4,719,192 A | * | 1/1988 | Schneider et al. | 502/84 |
| 7,585,477 B2 | * | 9/2009 | Nakatsuji et al. | 423/213.2 |
| 2003/0104932 A1 | * | 6/2003 | Kim | 502/216 |
| 2006/0083671 A1 | * | 4/2006 | Obayashi et al. | 423/239.1 |
| 2007/0179053 A1 | * | 8/2007 | Lee et al. | 502/304 |

FOREIGN PATENT DOCUMENTS

| | | |
|---|---|---|
| JP | 2002-273227 | 9/2002 |
| KR | 10-2003-0080247 | 10/2003 |
| KR | 10-2008-0007622 | 1/2008 |
| KR | 10-0831014 B1 | 5/2008 |

OTHER PUBLICATIONS

A. Jones, M. Clemmet, A. Higton, E. Golding. Access to Chemistry, The Royal Society of Chemistry 1999, Module 5.5.4, pp. 260-262.*
KIPO Notice of Decision to Grant, dated Jan. 28, 2010, for priority Korean application 10-2008-0017271, noting listed references in this IDS.

* cited by examiner

*Primary Examiner*—Jennifer K Michener
*Assistant Examiner*—Carlos Barcena
(74) *Attorney, Agent, or Firm*—Christie, Parker & Hale, LLP

(57) ABSTRACT

A fuel cell reforming catalyst includes a platinum-group metal; an inorganic oxide selected from $CeO_2$, $Pr_6O_{11}$, and combinations thereof; a strong acid ion; and a carrier. The fuel cell reforming catalyst has high activity for the reforming reaction at low temperatures and low space velocities.

9 Claims, 18 Drawing Sheets

FUEL CELL REFORMING CATALYST, METHOD OF PREPARING THE SAME, REFORMER FOR FUEL CELL, AND FUEL CELL SYSTEM INCLUDING THE SAME

CROSS-REFERENCE TO RELATED APPLICATION

This application claims priority to and the benefit of Korean Patent Application No. 10-2008-0017271 filed in the Korean Intellectual Property Office on Feb. 26, 2008, the entire content of which is incorporated herein by reference.

BACKGROUND OF THE INVENTION

1. Field of the Invention

The present invention relates to fuel cell reforming catalysts, methods of preparing the same, reformers for fuel cells, and fuel cell systems including the same.

2. Description of the Related Art

Fuel cells are power generation systems that produce electrical energy through an electrochemical redox reaction of oxygen and hydrogen in hydrocarbon-based materials such as methanol, ethanol, or natural gas. Fuel cells are clean energy sources that can replace fossil fuels.

A fuel cell includes a stack composed of unit cells and produces various ranges of power. Since fuel cells have four to ten times higher energy densities than small lithium batteries, they have been highlighted for use as small portable power sources.

Representative fuel cells include polymer electrolyte membrane fuel cells (PEMFCs) and direct oxidation fuel cells (DOFCs). Direct oxidation fuel cells include direct methanol fuel cells (DMFCs) which use methanol as the fuel.

In the above-mentioned fuel cell system, the stack that generates electricity includes several to scores of unit cells stacked adjacent to one another. Each unit cell is formed of a membrane-electrode assembly (MEA) and a separator (also referred to as a bipolar plate). The membrane-electrode assembly is composed of an anode and a cathode which are separated by a polymer electrolyte membrane. A fuel is supplied to the anode and adsorbed on anode catalysts. The fuel is then oxidized to produce protons and electrons. The electrons are transferred to the cathode via an external circuit, and the protons are transferred to the cathode through the polymer electrolyte membrane. In addition, an oxidant is supplied to the cathode. Then, the oxidant, protons, and electrons are reacted on cathode catalysts to produce electricity and water.

Polymer electrolyte fuel cells have high energy densities and high power but require the careful handling of hydrogen gas and require accessory facilities for producing hydrogen as the fuel gas such as fuel reforming processors for reforming methane or methanol, natural gas, or the like.

In general, hydrogen is produced from hydrocarbons such as methane through a reforming reaction such as a steam reforming reaction, a partial oxidation reaction, a carbon dioxide reforming reaction, or a combination of a partial oxidation reaction and a steam reforming reaction.

SUMMARY OF THE INVENTION

One embodiment of the present invention provides a fuel cell reforming catalyst having high activity for a reforming reaction at low temperatures and low space velocities.

Another embodiment of the present invention provides a method of preparing the reforming catalyst.

Further, another embodiment of the present invention provides a reformer for a fuel cell including the reforming catalyst.

Still another embodiment of the present invention provides a fuel cell system including the reformer.

According to an embodiment of the present invention, a fuel cell reforming catalyst includes a platinum-group metal; an inorganic oxide selected from $CeO_2$, $Pr_6O_{11}$, and combinations thereof; a strong acid ion; and a carrier. The inorganic oxide is supported on the carrier, and the supported inorganic oxide is surface-treated by the strong acid ion. The platinum-group metal is disposed on the surface of the surface-treated inorganic oxide.

The carrier may be selected from $Al_2O_3$, $TiO_2$, and combinations thereof.

The platinum-group metal may be selected from Pt, Pd, Ru, Rh, and combinations thereof.

The strong acid ion may be selected from sulfuric acid ions, phosphoric acid ions, and combinations thereof.

The reforming catalyst includes from about 0.1 to about 5 wt % of the platinum-group metal, from about 4 to about 30 wt % of the inorganic oxide, from about 1 to about 6 wt % of an element derived from the strong acid ion, and the carrier makes up the balance.

The reforming catalyst includes from about 2 to about 15 wt % of $CeO_2$ and from 2 to about 15 wt % of $Pr_6O_{11}$. The $CeO_2$ and the $Pr_6O_{11}$ are included in a weight ratio ranging from about 1:1 to about 6:1.

The reforming catalyst comprises $ZrO_2$ in an amount ranging from about 2 to about 15 wt %.

According to another embodiment of the present invention, a method of preparing a fuel cell reforming catalyst includes mixing an inorganic oxide precursor and a carrier in a first solvent to prepare a first catalyst precursor including an inorganic oxide supported on the carrier. The first catalyst precursor is impregnated in a strong acid solution to prepare a second catalyst precursor including the inorganic oxide which is surface-treated by the strong acid. The second catalyst precursor and a platinum-group metal-containing precursor are mixed in a second solvent, and the mixture is fired.

During preparation of the first catalyst precursor, a $ZrO_2$ precursor may be further mixed with the inorganic oxide precursor and carrier.

The carrier may be selected from $Al_2O_3$, $TiO_2$, and combinations thereof.

The strong acid solution may include an acid ion selected from sulfuric acid ions, phosphoric acid ions, and combinations thereof.

The firing may be performed at a temperature ranging from about 650 to about 800° C. for from about 1 to about 2 hours.

According to another embodiment of the present invention, a reformer for a fuel cell includes the reforming catalyst.

According to yet another embodiment of the present invention, a fuel cell system includes the reformer.

The fuel cell reforming catalysts of the present invention show high activity for reforming reactions at low temperatures and low space velocities.

DETAILED DESCRIPTION OF THE EMBODIMENTS

According to one embodiment of the present invention, a fuel cell reforming catalyst includes a platinum-group metal; an inorganic oxide selected from $CeO_2$, $Pr_6O_{11}$, and combinations thereof; a strong acid ion; and a carrier. The inorganic oxide is supported on the carrier, and the supported inorganic oxide is surface-treated by the strong acid ion. The platinum-group metal is disposed on the surface of the surface-treated inorganic oxide.

The strong acid ion provides a strong acid site on the surface of the inorganic oxide. The strong acid ion is strongly united with the inorganic oxide, and therefore has a thermally stable inorganic oxide surface.

When the platinum-group metal is supported on the solid acid, the solid acid becomes a super acid and has a relatively large specific surface area (generally over 80 m²/g), thereby improving the activity of the catalyst.

Figure 1:
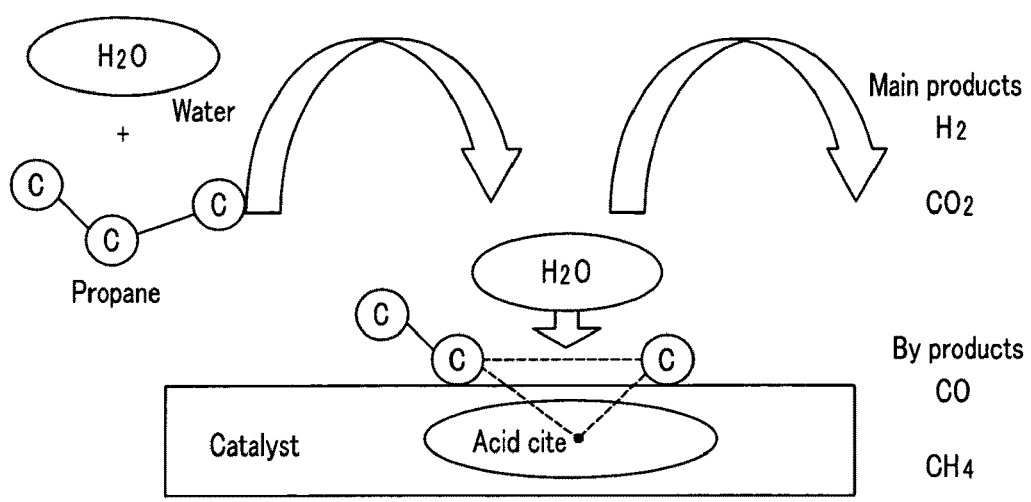
FIG. 1 is a schematic view of a steam reforming reaction of a reforming catalyst according to one embodiment of the present invention.

The reforming catalyst can be used in a steam reforming reaction. FIG. 1 is a schematic view of a steam reforming reaction. In addition, the following Reaction Scheme 1 shows a steam reforming reaction using propane as the fuel.

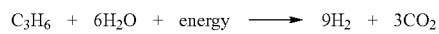

Reaction Scheme 1

$$C_3H_6 + 6H_2O + \text{energy} \longrightarrow 9H_2 + 3CO_2$$

Referring to FIG. 1, the propane fuel is absorbed in acid sites of the reforming catalyst and reacts with $H_2O$ to produce $H_2$. Since the fuel absorbed in the acid sites of the reforming catalyst has very strong acidity and high reactivity with $H_2O$, it may undergo a steam reforming reaction at low temperatures.

The reforming catalyst forms acid sites of 4+ or 6+. Reaction Schemes 2 to 4 show a mechanism of forming acid sites of 4+.

Reaction Scheme 2

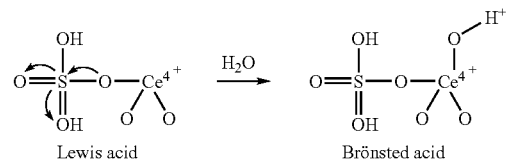

Lewis acid  Brönsted acid

Reaction Scheme 3

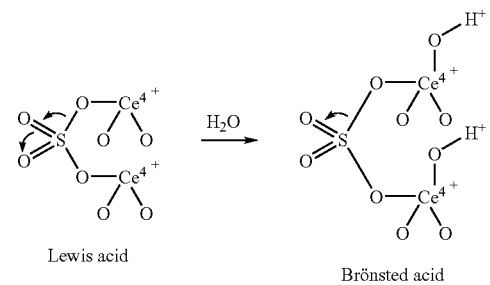

Lewis acid  Brönsted acid

Reaction Scheme 4

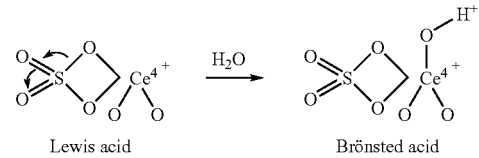

Lewis acid  Brönsted acid

The reforming catalyst has no activity unless it is supported on the carrier. Accordingly, the reforming catalyst must include the carrier. The carrier may be selected from $Al_2O_3$, $TiO_2$, $SiO_2$, and combinations thereof. According to one embodiment, the carrier may be $Al_2O_3$.

The platinum-group metal may be selected from Pt, Pd, Ru, Rh and combinations thereof. According to one embodiment, the platinum-group metal is Pt or Rh.

The strong acid ion may be selected from sulfuric acid ions, phosphoric acid ions, and combinations thereof. According to one embodiment, the strong acid ion is a sulfuric acid ion.

The reforming catalyst may include from about 1 to about 5 wt % of the platinum-group metal, and in one exemplary embodiment includes from about 2 to about 4 wt % of the platinum-group metal. The reforming catalyst also includes from about 4 to about 30 wt % of the inorganic oxide, and in one exemplary embodiment includes from about 10 to about 20 wt % of the inorganic oxide. Also, the reforming catalyst includes from about 1 to about 6 wt % of an element derived from the strong acid ion, and in one exemplary embodiment includes from about 2 to about 4 wt % of an element derived from the strong acid ion. The carrier makes up the balance of the weight of the catalyst.

When the platinum-group metal is included in an amount less than about 1 wt %, the reforming catalyst may have very few active sites on its surface, thereby deteriorating catalyst activity. When the platinum-group metal is included in an amount greater than about 5 wt %, the inorganic oxide may be included in a lesser amount than the platinum-group metal, which is not desirable.

In addition, when the inorganic oxide is included in an amount less than about 4 wt %, it may have a small effect. When the inorganic oxide is included in an amount greater than about 30 wt %, it may form a layer on the surface of the carrier that is too large.

When the element derived from the strong acid ion is included in an amount less than about 1 wt %, the strong acid ions may decrease in number. Accordingly, acid sites may decrease in number. When the element derived from the strong acid ion is included in an amount greater than about 6 wt %, the platinum-group metal may be included in a smaller amount, thereby decreasing the amount of reforming catalyst.

When the strong acid ion is a sulfuric acid ion, the element derived from the strong acid ion is sulfur, and when the strong acid ion is a phosphoric acid ion, the element derived from the strong acid ion is phosphorus.

In some embodiments, the inorganic oxide may include both $CeO_2$ and $Pr_6O_{11}$. In such embodiments, the reforming catalyst may include the $CeO_2$ in an amount ranging from about 2 to about 15 wt % and the $Pr_6O_{11}$ in an amount ranging from about 2 to about 15 wt %. According to another embodiment, the reforming catalyst may include the $CeO_2$ in an amount ranging from about 5 to about 10 wt % and the $Pr_6O_{11}$ in an amount ranging from about 5 to about 10 wt %. When the $CeO_2$ or $Pr_6O_{11}$ is included in an amount less than about 2 wt %, the amount of inorganic oxide is too small, thereby failing to improve catalyst activity. When the $CeO_2$ or $Pr_6O_{11}$ is included in an amount greater than about 15 wt %, the amount of the other components may be too small, thereby breaking the balance between $CeO_2$ and $Pr_6O_{11}$.

The $CeO_2$ and $Pr_6O_{11}$ may be included in a weight ratio ranging from about 1:1 to about 6:1. When the $CeO_2$ and $Pr_6O_{11}$ are included within this weight ratio range, the catalyst has excellent oxygen storage capabilities, thereby preventing carbonization of the catalyst.

In addition, the reforming catalyst may additionally include $ZrO_2$. The reforming catalyst may include the $ZrO_2$ in an amount ranging from about 2 to about 15 wt %. According to another embodiment, the $ZrO_2$ may be included in an amount ranging from about 5 to about 10 wt %. When the $ZrO_2$ is included within these ranges, it can improve the thermal stability of the reforming catalyst, thereby improving oxygen storage capabilities and catalyst activity.

According to one embodiment of the present invention, a method of preparing the reforming catalyst includes mixing an inorganic oxide precursor and a carrier in a first solvent to prepare a first catalyst precursor including an inorganic oxide supported on the carrier. The method further includes impregnating the first catalyst precursor in a strong acid solution to prepare a second catalyst precursor including an inorganic oxide that is surface-treated by the strong acid. The second catalyst precursor is then mixed with a platinum-group metal-containing precursor in a second solvent, and the mixture is fired.

The inorganic oxide precursor may be selected from cerium nitrate, cerium acetate, cerium alkoxide, praseodymium nitrate, praseodymium acetate, praseodymium alkoxide, hydrates thereof, and combinations thereof.

The carrier may be selected from $Al_2O_3$, $TiO_2$, and combinations thereof. According to one embodiment, the carrier is $Al_2O_3$.

The amount of the inorganic oxide precursor and the carrier may be adjusted depending on the amount of inorganic oxide and carrier desired in the final reforming catalyst.

Each of the first and second solvents is independently selected from water, ethanol, isopropanol, acetone, methyl ethyl ketone, methyl iso butyl ketone, and combinations thereof.

The strong acid solution may include an acid ion selected from sulfuric acid ions, phosphoric acid ions, and combinations thereof. The strong acid solution is prepared by adding a strong acid ion-containing compound to a solvent. The strong acid ion-containing compound may include sulfuric acid, ammonium sulfate, sulfurous acid, ammonium sulfite, thionyl chloride, dimethyl sulfuric acid, phosphoric acid, ammonium phosphate, and combinations thereof. The solvent may include water, ethanol, isopropanol, acetone, methyl ethyl ketone, methyl isobutyl ketone, and combinations thereof.

The impregnation is not limited but can be performed at room temperature for from about 5 to about 45 minutes. According to another embodiment, the impregnation can be performed at a temperature ranging from about 18 to about 28° C. for from about 20 to about 40 minutes. When the impregnation is performed within these temperature and time ranges, the inorganic oxide has sufficient acid sites on its surface. In addition, the concentration of the strong acid solution or the amount of the first catalyst precursor can be adjusted depending on the amount of strong acid ions desired in the final reforming catalyst.

The first catalyst precursor or the second catalyst precursor should be calcined at a temperature ranging from about 500 to about 800° C. When the precursors are calcined at temperatures lower than about 500° C., the strong acid may not have sufficient acid sites. When the precursors are calcined at temperatures greater than about 800° C., the catalyst may break. In addition, the precursors may be calcined for from about 1 to about 2 hours. When the precursors are calcined within this time period, the catalyst is heated at a stable temperature. However, calcining the precursors for more than 2 hours wastes time and money.

According to an embodiment of the invention, the platinum-group metal-containing precursor is selected from $H_2PtCl_6$, $Pt(C_5H_7O_2)_2$, $H_6Cl_2N_2Pt$, $PtCl_2$, $PtBr_2$, $PdCl_2$, $Pd(C_2H_3O_2)_2$, $Pd(C_5H_7O_2)_2$, $RuCl_3$, $Ru(C_5H_7O_2)_3$, $(NH_4)_2RuCl_6$, $(NH_4)_3RhCl_6$, $[Rh(CH_3COO)_2]_2$, $Rh(H_2O)(NO_3)_3$, hydrates thereof, and combinations thereof. The amount of the platinum-group metal-containing precursor can also be adjusted depending on the amount of platinum-group metal desired in the final reforming catalyst The calcining can be performed at a temperature ranging from about 650 to about 800° C. When the calcining is performed at a temperature lower than about 650° C., the platinum-group metal may not be formed from the platinum-group metal-containing precursor. When the calcining is performed at a temperature greater than about 800° C., the catalyst may break. In addition, the calcining may be performed for from about 1 to about 2 hours. When the calcining is performed within this time range, the catalyst can be heated at a stable temperature. However, calcining for more than 2 hours wastes time and money.

In the process of preparing the first catalyst precursor, a $ZrO_2$ precursor as well as the inorganic oxide precursor can be added. The amount of $ZrO_2$ can be adjusted depending on the amount of $ZrO_2$ desired in the final reforming catalyst.

According to a further embodiment of the present invention, a reformer for a fuel cell includes the reforming catalyst.

According to another embodiment of the present invention, a fuel cell system includes the above reformer, at least one electricity generating element for generating electrical energy through an electrochemical reaction of hydrogen and an oxidant, a fuel supplier for supplying a fuel to the reformer, and an oxidant supplier for supplying an oxidant to the reformer and the electricity generating element.

Figure 2:
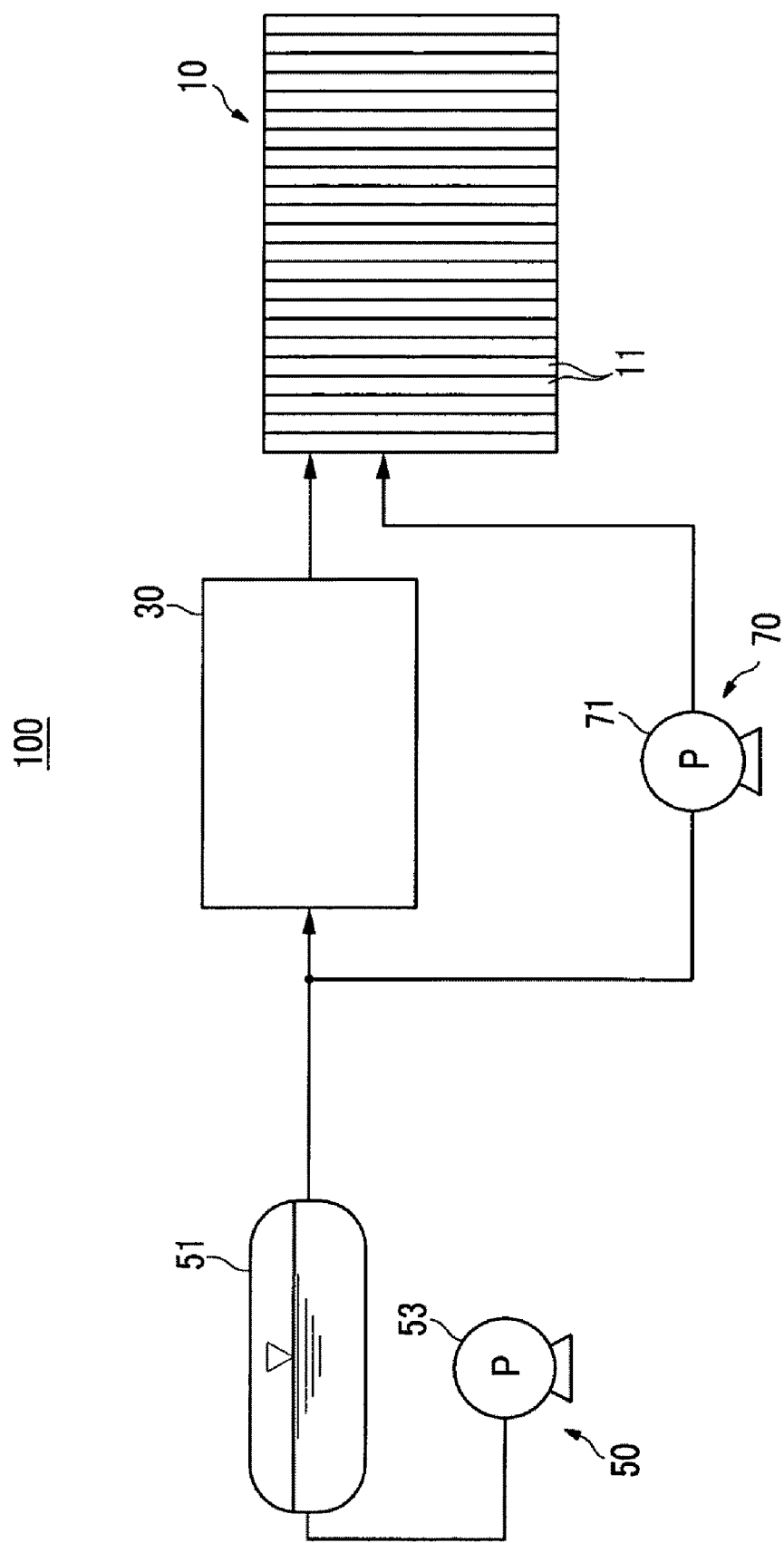
FIG. 2 is a schematic diagram of the structure of a fuel cell system according to another embodiment of the present invention.
Figure 3:
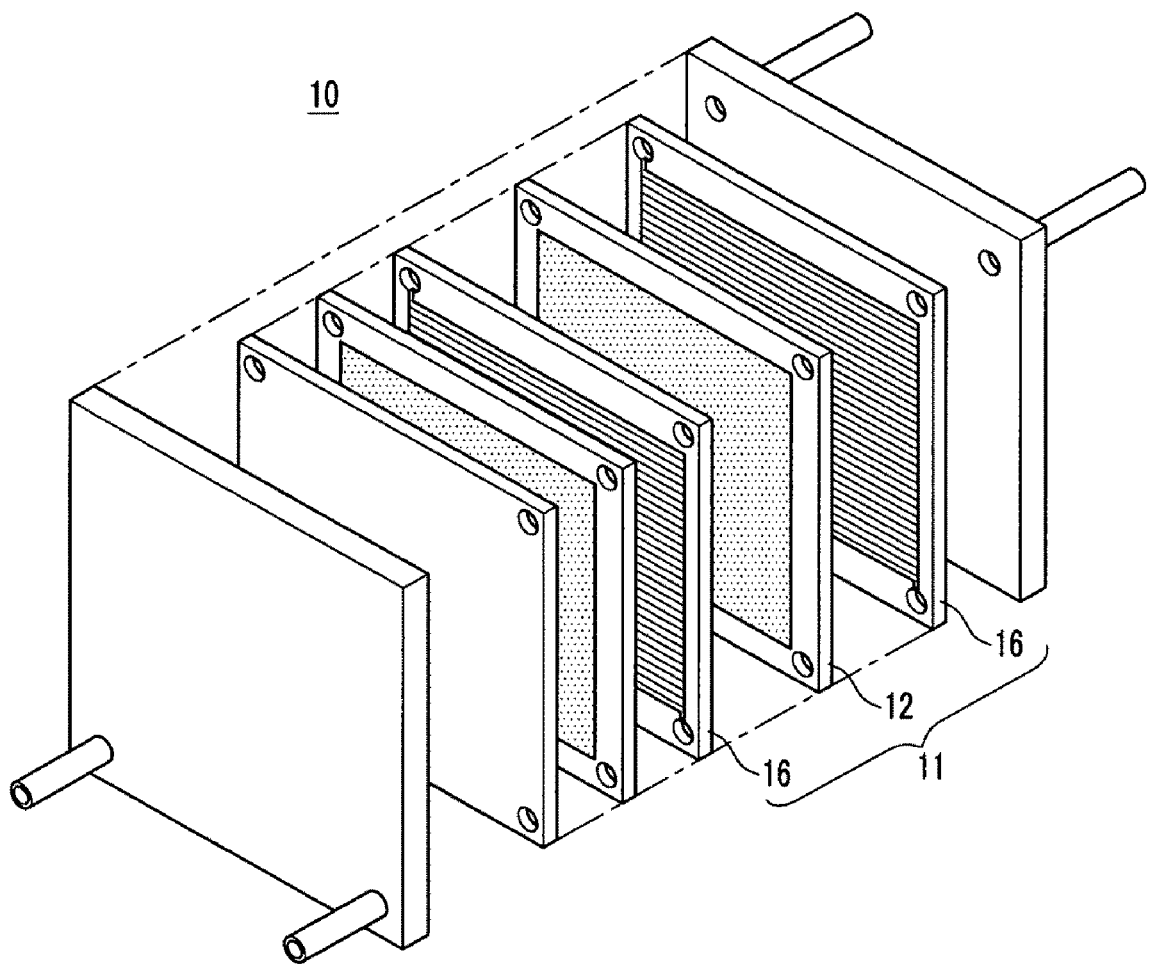
FIG. 3 is an exploded perspective view of the stack structure of the fuel cell system illustrated in FIG. 2.
Figure 4:
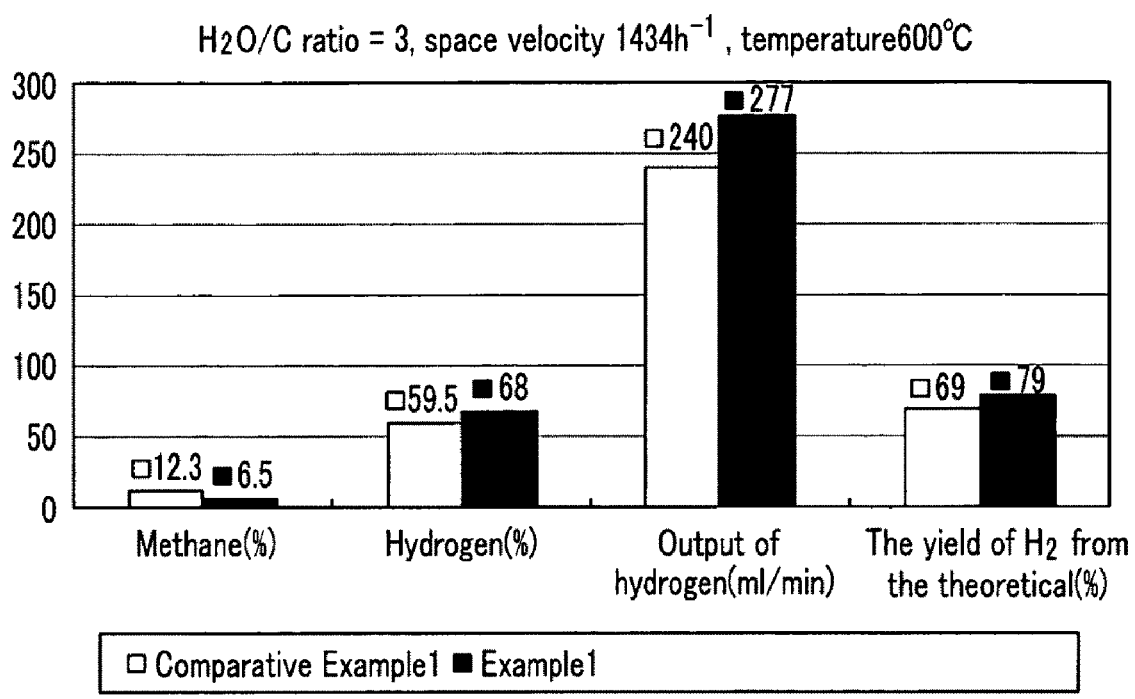
FIG. 4 is a graph showing the hydrogen yield at 600° C. of the reforming catalysts prepared according to Example 1 and Comparative Example 1.
Figure 5:
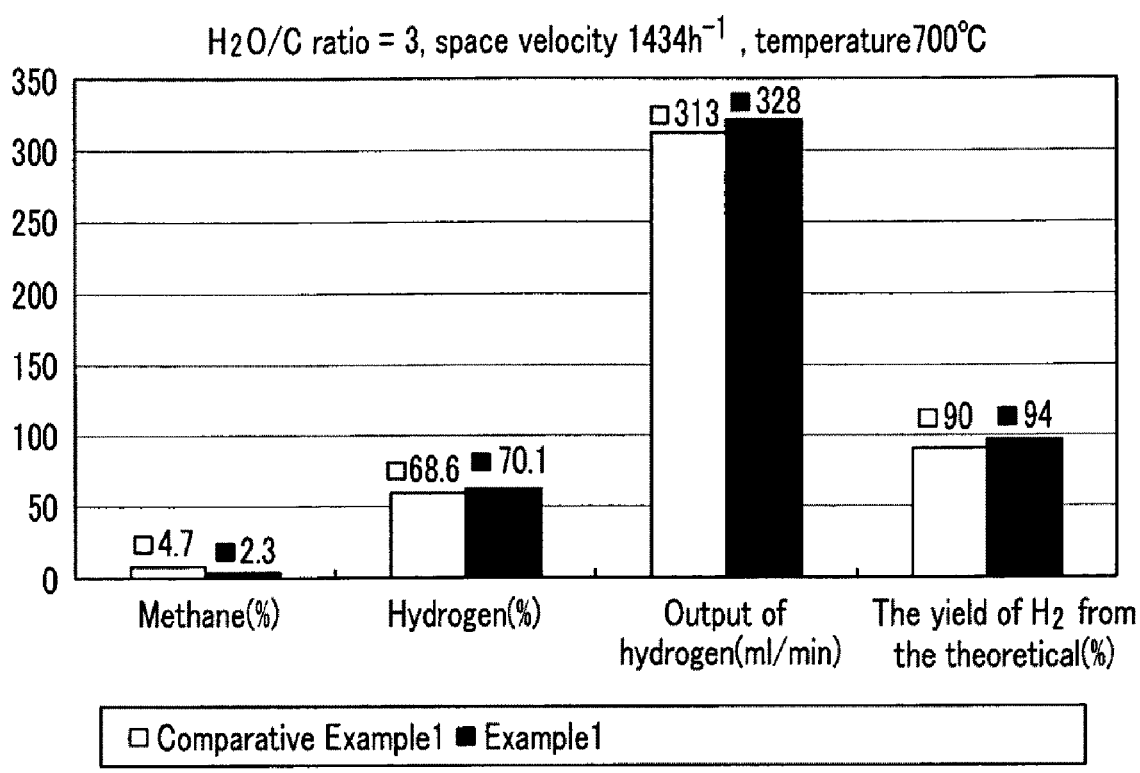
FIG. 5 is a graph showing the hydrogen yield at 700° C. of the reforming catalysts prepared according to Example 1 and Comparative Example 1.
Figure 6:
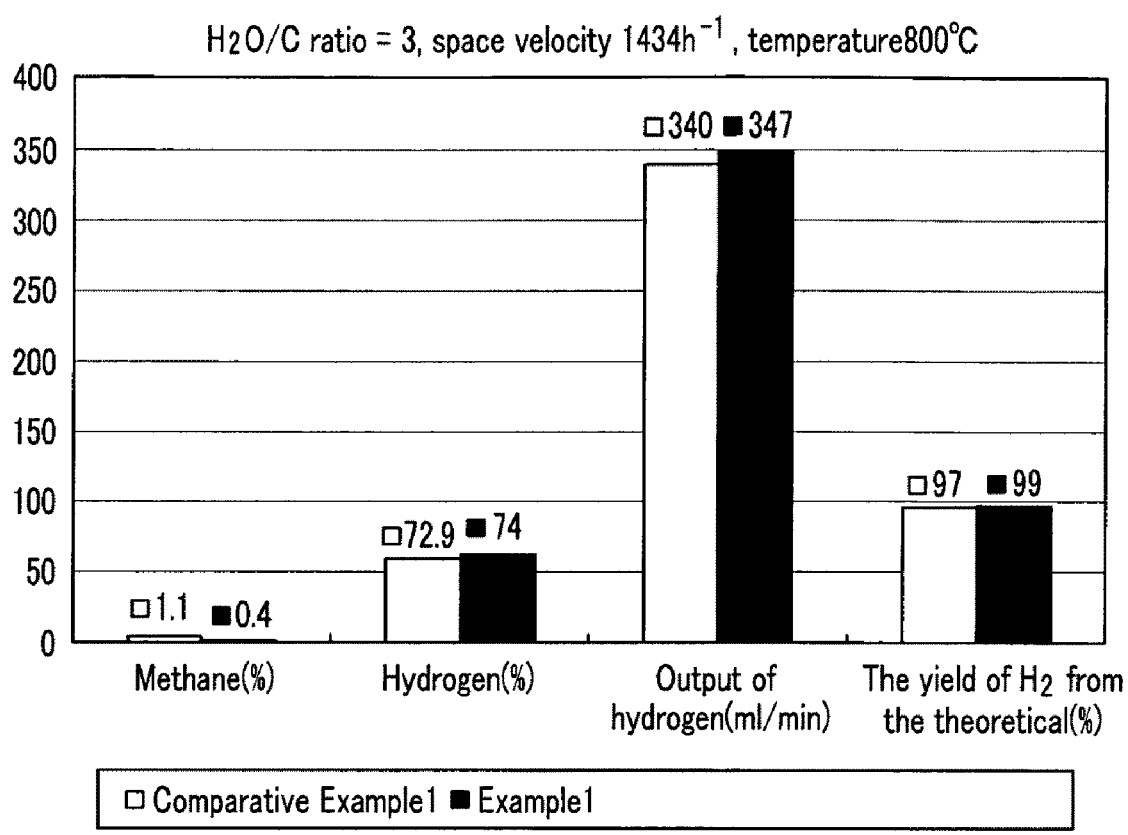
FIG. 6 is a graph showing the hydrogen yield at 800° C. of the reforming catalysts prepared according to Example 1 and Comparative Example 1.
Figure 7:
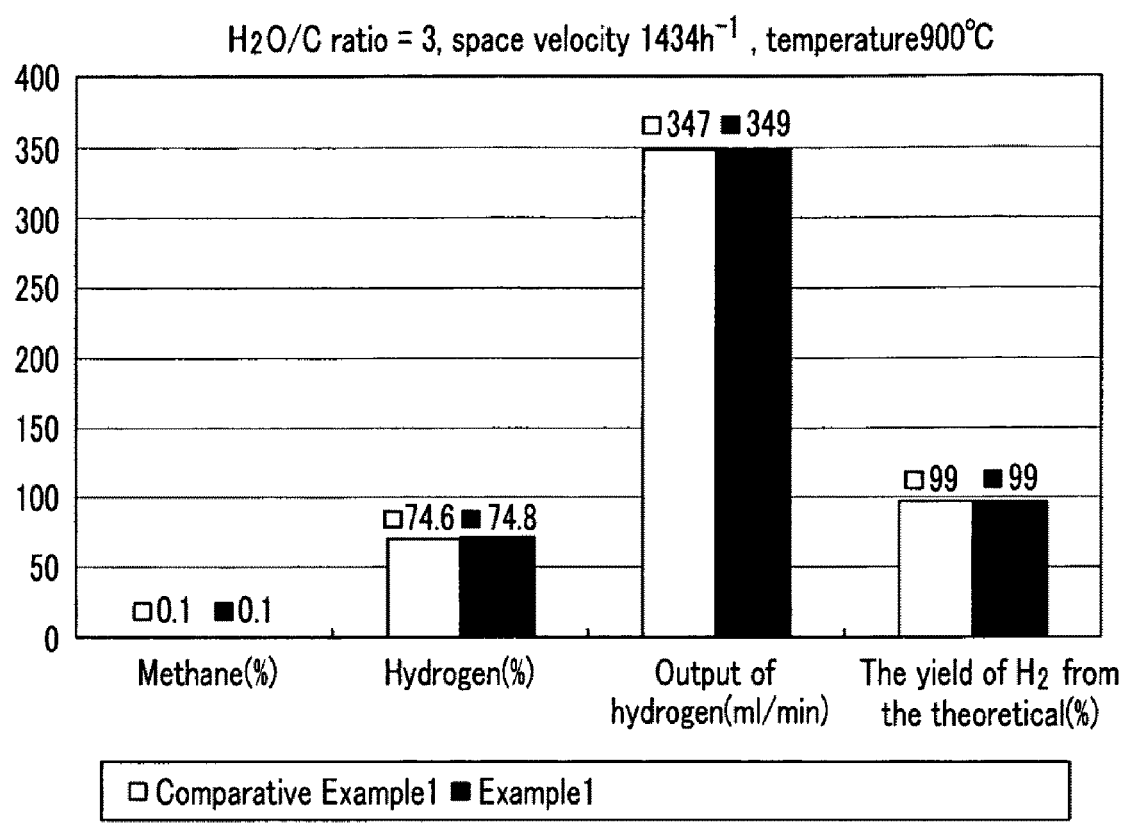
FIG. 7 is a graph showing the hydrogen yield at 900° C. of the reforming catalysts prepared according to Example 1 and Comparative Example 1.

FIG. 2 is a schematic view of the structure of a fuel cell system according to one embodiment of the present invention, and FIG. 3 is an exploded perspective view of the stack structure of the fuel cell system illustrated in FIG. 2.

Referring to the drawings, a fuel cell system 100 is a polymer electrolyte membrane fuel cell (PEMFC) in which a hydrogen-containing fuel is reformed to generate hydrogen, and then electrical energy is generated through an electrochemical reaction of the hydrogen and an oxidant. In the fuel cell system 100, the oxidant includes a gas that reacts with hydrogen, for example, oxygen or air (which contains oxygen) stored in a separate storage space.

The fuel cell system 100 includes electricity generating elements 11 that generate electrical energy through an electrochemical reaction of a reformed gas supplied from a reformer 30 and an oxidant. The system 100 also includes a fuel supplier 50 for supplying a fuel to the reformer 30 which generates hydrogen from a fuel and supplies the hydrogen to the electricity generating elements 11. The system 100 also includes an oxidant supplier 70 for supplying oxidant to the reformer 30 and the electricity generating elements 11. The electricity generating elements 11 are stacked to form a stack 10.

Such a fuel cell system 100 can be a power source for supplying electrical energy to any load, such as portable electronic devices including laptop computers, PDAs and mobile telecommunication devices.

The reformer 30 includes a reforming reactor (not shown) that produces hydrogen through a reforming catalyst reaction (for example, a steam reforming (SR) catalyst reaction) of a fuel provided from a fuel supplier 50. The reforming reactor includes a reforming catalyst according to an embodiment of the present invention.

When the reactor body is composed of a reaction substrate, the reforming catalyst may be disposed inside a channel of the reaction substrate. Alternatively, when the reactor body is composed of a container, a pellet or honey-comb type reforming catalyst is filled inside the reactor body.

The reformer 30 further includes a heating source (not shown) for generating the heat required for the reforming catalyst reaction of the fuel, which reaction includes an oxidation catalyst reaction between the fuel supplied by the fuel supplier 50 and the oxidant supplied from the oxidant supplier 70. The reformer also includes a carbon monoxide reducer (not shown) which optionally oxidizes carbon monoxide. The heating source and the reforming reactor of the reformer may be independently equipped and connected to each other via a common connector. Alternatively, they may be incorporated in a double pipeline in which the heating source is disposed inside and the reforming reactor is disposed outside.

The fuel supplier 50 for supplying the fuel to the reformer 30 includes a fuel tank 51 containing the fuel to be supplied to the reformer 30 and a fuel pump 53 connected to the fuel tank 51 for supplying the fuel from the fuel tank 51. The fuel tank 51 is connected to the reformer 30 via pipelines.

The oxidant supplier 70 includes an air pump 71 for air as the oxidant to the electricity generating elements 11 of the stack 10. According to the illustrated embodiment, the oxidant supplier 70 supplies the oxidant to the stack 10 via a single air pump 71, but the oxidant supplier is not limited thereto and may include a pair of oxidant pumps mounted to the stack 10.

Upon driving the system 100 according to some embodiments of the present invention, hydrogen generated from the reformer 30 is supplied to the electricity generating elements 11 and oxidant is supplied to the electricity generating elements 11. The electrochemical reaction occurs through the oxidation reaction of the hydrogen and the reduction reaction of the oxidant to generate electrical energy having a power output as well as water and heat.

Furthermore, the fuel cell system 100 may include a separately mounted common control unit (not shown) for substantially controlling the overall operation of the system, for example, for controlling operation of the fuel supplier 50 and the oxidant supplier 70.

As shown in FIG. 3, the stack 10 is composed of a plurality of stacked electricity generating elements 11. Each electricity generating element 11 includes a membrane-electrode assembly (MEA) 12 and separators (or bipolar plates) 16 disposed at both sides of the MEA, making up a minimum unit of the fuel cell.

The membrane-electrode assembly 12 includes an anode and a cathode, and an electrolyte membrane between the anode and cathode. The anode has an active area for the electrochemical reaction of hydrogen and the cathode has an active area for the electrochemical reaction of the oxidant.

At the anode, hydrogen is oxidized to produce protons and electrons, and at the cathode, the protons react with the oxidant to generate heat and moisture. The electrolyte membrane functions as an ion exchanger for transferring the protons generated at the anode to the cathode. The separators 16 supply a fuel and an oxidant to the membrane-electrode assemblies 12 and also work as conductors for serially coupling the anodes and the cathodes in the membrane-electrode assemblies 12.

The stack 10 may be provided as a stack of a polymer electrolyte type fuel cells.

The following examples are presented for illustrative purposes only and do not limit the scope of the present invention.

Preparation of a Reforming Catalyst

Preparation Example 1

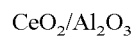

20.81 g of Ce $NO_{33}.6H_2O$ were added to 20 ml of water to prepare a solution. Then, 31.75 g of $Al_2O_3$ pellets were added to the solution so that the solution could be absorbed in the $Al_2O_3$ pellets. The $Al_2O_3$ pellets were calcined at 500° C. for 1 hour at a speed of 10° C./min, thereby preparing 40 g of $CeO_2/Al_2O_3$. $CeO_2$ was included in an amount of 20.62 wt %, and $Al_2O_3$ was included in an amount of 79.38 wt %.

Preparation Example 2

$CeO_2/SO_4^{2-}/Al_2O_3$ 0.626 g of $H_2SO_4$ was added to 10 ml of water. Then, water was further added to the solution to a total volume of 15 ml while agitating, thereby preparing a thin sulfuric acid solution.

15 g of the $CeO_2/Al_2O_3$ prepared according to Preparation Example 1 were added to the thin sulfuric acid solution to surface-treat the $CeO_2/Al_2O_3$ with sulfuric acid ions for 30 minutes. The $CeO_2/Al_2O_3$ treated with sulfuric acid ions was calcined at 650° C. for 1 hour, thereby preparing 15 g of $CeO_2/SO_4^{2-}/Al_2O_3$.

Example 1

Preparation of $Pt/CeO_2/SO_4^{2-}/Al_2O_3$

The $CeO_2/SO_4^{2-}/Al_2O_3$ prepared according to Preparation Examples 1 and 2 and 1.23 g of $H_2PtCl_6.6H_2O$ were added to 3 ml of water. The resulting product was dried in air for 30 minutes and then heat-treated at 200° C. for 1 hour at a speed of 10° C./min, thereby preparing 15.46 g of $Pt/CeO_2/SO_4^{2-}/Al_2O_3$. The prepared $Pt/CeO_2/SO_4^{2-}/Al_2O_3$ was fired at 650° C. for 1 hour. Pt was included in an amount of 3 wt %, $CeO_2$ was included in an amount of 20 wt %, and $Al_2O_3$ was included in an amount of 77 wt %.

Comparative Example 1

Preparation of $Pt/CeO_2/Al_2O_3$ 15.46 g of $Pt/CeO_2/Al_2O_3$ was prepared by adding the $CeO_2/Al_2O_3$ prepared according to Preparation Example 1 and 1.23 g of $H_2PtCl_6.6H_2O$ to 3 ml of water. The resulting product was dried in air for 30 minutes and heat-treated at 200° C. for 1 hour at a speed of 10° C./min. The prepared $Pt/CeO_2/Al_2O_3$ was fired at 650° C. for 1 hour. Pt was included in an amount of 3 wt %, $CeO_2$ was included in an amount of 20 wt %, and $Al_2O_3$ was included in an amount of 77 wt %.

Comparative Example 2

Preparation of $Pt/CeO_2/SO_4^{2-}$ 122.35 g of $Ce NO_{33}.6H_2O$ was added to 120 ml of water to prepare a solution. Then, the solution was fired at 500° C. for 1 hour at a speed of 10° C./min to prepare 48 g of $CeO_2$.

0.626 g of $H_2SO_4$ was added to 10 ml of water. Then, water was added to the resulting product to a total volume of 15 ml while agitating, thereby preparing a thin sulfuric acid solution.

15 g of the $CeO_2$ were added to the prepared thin sulfuric acid solution to treat the surface of the $CeO_2$ with sulfuric acid ions for 30 minutes. The $CeO_2$ surface-treated with sulfuric acid ions was calcined at 650° for 1 hour, thereby preparing 15 g of $CeO_2/SO_4^{2-}$.

15 g of the prepared $CeO_2/SO_4^{2-}$ and 1.23 g of $H_2PtCl_6.6H_2O$ were added to 3 ml of water. The resulting product was dried in air for 30 minutes and then heat-treated at 200° C. for 1 hour at a speed of 10° C./min, thereby preparing 15.46 g of $Pt/CeO_2/SO_4^{2-}$. The prepared $Pt/CeO_2/SO_4^{2-}$ was fired at 650° C. for 1 hour. Pt was included in an amount of 3 wt %, and $CeO_2$ was included in an amount of 97 wt %.

Preparation Example 3

$ZrO_2/CeO_2/Pr_6O_{11}/Al_2O_3$ 17.05 g of $ZrO NO_{32}.4H_2O$, 24.42 g of $Ce NO_{33}.6H_2O$, and 24.45 g of $Pr NO_{33}. 6H_2O$ were added to 200 ml of water. Then, $Al_2O_3$ pellets were added to the solution to a total volume of 100 ml. The resulting solution was reacted at 210° C. for 2 hours and then allowed to stand at room temperature, thereby acquiring $Al_2O_3$ pellets coated with a greenish film. $ZrO_2$ was included in an amount of 6.3 g, $CeO_2$ was included in an amount of 8.8 wt %, $Pr_6O_{11}$ was included in an amount of 8.7 g, and $Al_2O_3$ was included in an amount of 76.25 wt %.

Preparation Example 4

$ZrO_2/CeO_2/Pr_6O_{11}/SO_4^{2-}/Al_2O_3$ 93 g of $ZrO_2/CeO_2/Pr_6O_{11}/Al_2O_3$ prepared according to Preparation Example 3 was added to 100 ml of a 0.5M sulfuric acid solution to surface-treat the $ZrO_2/CeO_2/Pr_6O_{11}/Al_2O_3$ with sulfuric acid ions for 30 minutes. Then, the $ZrO_2/CeO_2/Pr_6O_{11}/Al_2O_3$ surface-treated with sulfuric acid ions was calcined at 650° C. for 1 hour, thereby preparing $ZrO_2/CeO_2/Pr_6O_{11}/SO_4^{2-}/Al_2O_3$.

Example 2

Preparation of $Rh/ZrO_2/CeO_2/Pr_6O_{11}/SO_4^{2-}/Al_2O_3$ 35 ml of water were added to 10 ml of a rhodium (III) nitrate solution (Alfa Aesar Co.) to prepare a precursor solution. 44 g of the $ZrO_2/CeO_2/Pr_6O_{11}/SO_4^{2-}/Al_2O_3$ prepared according to Preparation Example 4 were added to the precursor solution so that the $ZrO_2/CeO_2/Pr_6O_{11}/SO_4^{2-}/Al_2O_3$ could absorb the rhodium nitrate solution. The solution remaining after absorption was evaporated on a hot plate for 30 minutes to prepare $Rh/ZrO_2/CeO_2/Pr_6O_{11}/SO_4^{2-}/Al_2O_3$. The $Rh/ZrO_2/CeO_2/Pr_6O_{11}/SO_4^{2-}/Al_2O_3$ was fired at 650° C. for 90 minutes to acquire 47 g of $Rh/ZrO_2/CeO_2/Pr_6O_{11}/SO_4^{2-}/Al_2O_3$. The $Rh/ZrO_2/CeO_2/Pr_6O_{11}/SO_4^{2-}/Al_2O_3$ included Rh in an amount of 3 wt %, $ZrO_2$ in a amount of 6.1 wt %, $CeO_2$ in an amount of 8.4 wt %, $Pr_6O_{11}$ in an amount of 8.4 wt %, and $Al_2O_3$ in an amount of 74 wt %.

15 ml of the $Rh/ZrO_2/CeO_2/Pr_6O_{11}/SO_4^{2-}/Al_2O_3$ was charged in a reactor and the reactor was then provided with a gas including 70 volume % hydrogen, 10 volume % carbon monoxide, and the balance nitrogen at a speed of 800 ml/min. The catalyst was maintained at a temperature ranging from 450 to 470° C., and the gas was provided for 8 minutes for reduction of the $Rh/ZrO_2/CeO_2/Pr_6O_{11}/SO_4^{2-}/Al_2O_3$.

Device for Performance Evaluation of the Prepared Reforming Catalyst

The reactor (GMS 1000 from Sunyoung Sys-Tech Co.) was made of a stainless steel material. The internal temperature of the reactor was regulated using a thermocouple both inside and outside of the reactor. In addition, the volume of the gas was regulated using a mass flow control (MFC Co.). The composition of the gas was analyzed using a gas analyzer (Rosemount Analysis Co.).

Performance Evaluation of Reforming Catalysts Including Strong Acid Ions 15 ml of the reforming catalysts according to Example 1 and Comparative Example 1 were charged into the reactor. A gas including 95 volume % propane and 5 volume % butane was used as the fuel. The components of the gas released from the fuel were measured at a space velocity of 1434 $h^{-1}$, and a varying internal reactor temperature of 600° C., 700° C., 800° C., and 900° C. FIGS. 4 to 7 show the components of the released gas and hydrogen yield (%) depending on the internal reactor temperature.

Referring to FIGS. 4 to 7, the reforming catalyst according to Example 1 had excellent hydrogen yield at 600° C., while the reforming catalyst according to Comparative Example 1 had very low hydrogen yield at 600° C. In addition, the reforming catalyst according to Example 1 had almost perfect hydrogen yield at 900° C.

Thermal Stability Evaluation of Reforming Catalysts

Figure 8:
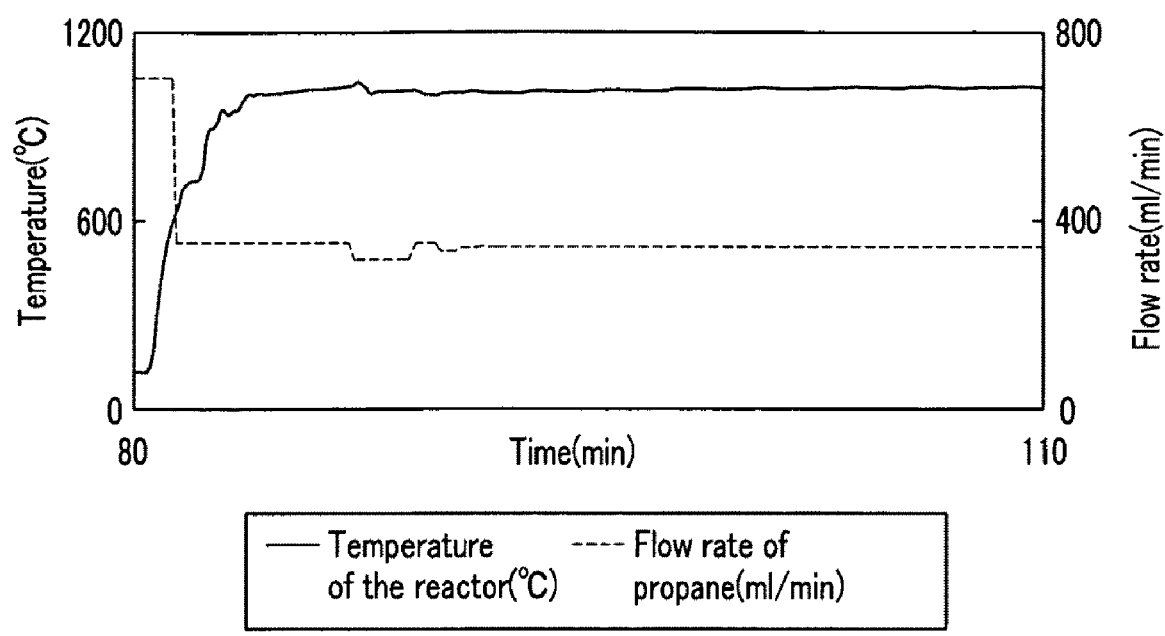
FIG. 8 is a graph of the thermal stability of the reforming catalyst prepared according to Example 1.

The reforming catalyst according to Example 1 was heated by combusting propane in a reactor. Thermal stability was measured at 1000° C. FIG. 8 shows the results. Air was provided at a speed of 5 l/min.

Referring to FIG. 8, the reforming catalyst of Example 1 was stable at the high temperature after aging.

Surface Distribution Analysis of Reforming Catalysts

The surface of the reforming catalyst of Example 1 was examined with a FE-SEM. The reforming catalyst was accelerated at a voltage of 15 kV. The FE-SEM results of the reforming catalyst prepared according to Example 1 are shown in FIGS. 9 to 14.

Figure 9:
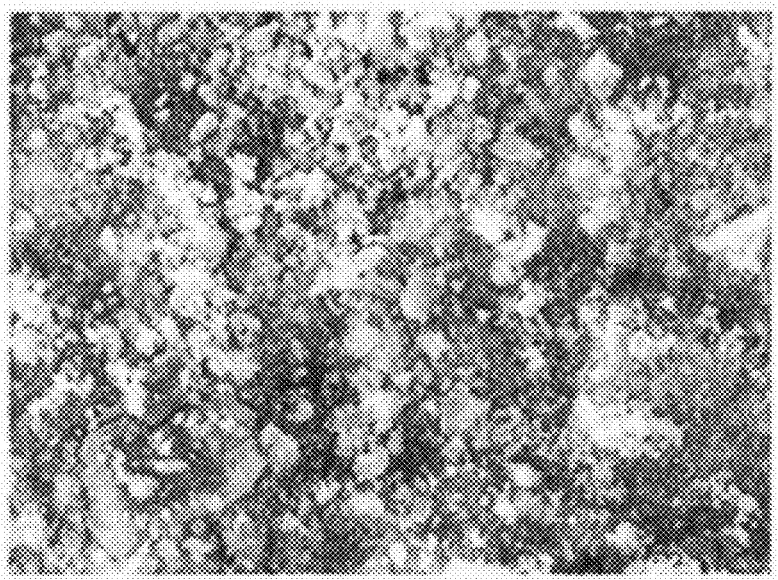
FIG. 9 is scanning electron microscope (FE-SEM) photograph of the surface of the reforming catalyst prepared according to Example 1.
Figure 10:
FIG. 10 is a FE-SEM photograph of the platinum distribution of the reforming catalyst prepared according to Example 1.
Figure 11:
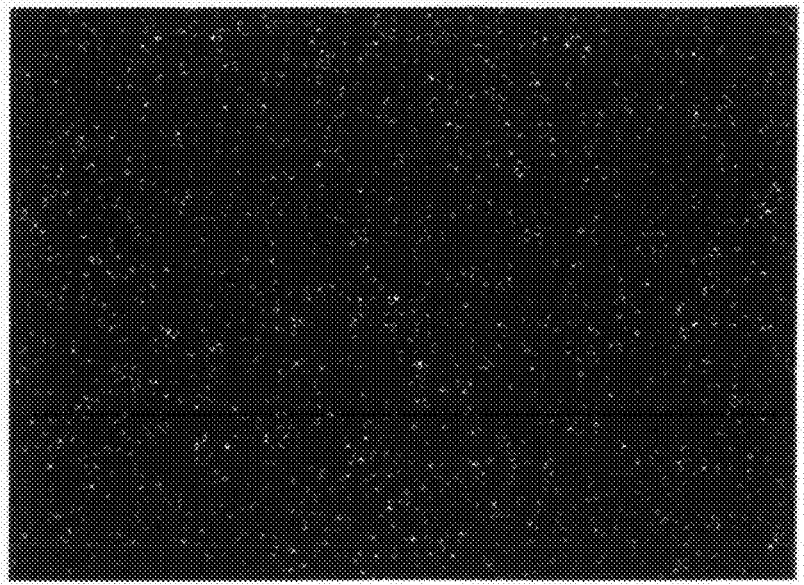
FIG. 11 is a FE-SEM photograph of the cerium distribution of the reforming catalyst prepared according to Example 1.
Figure 12:
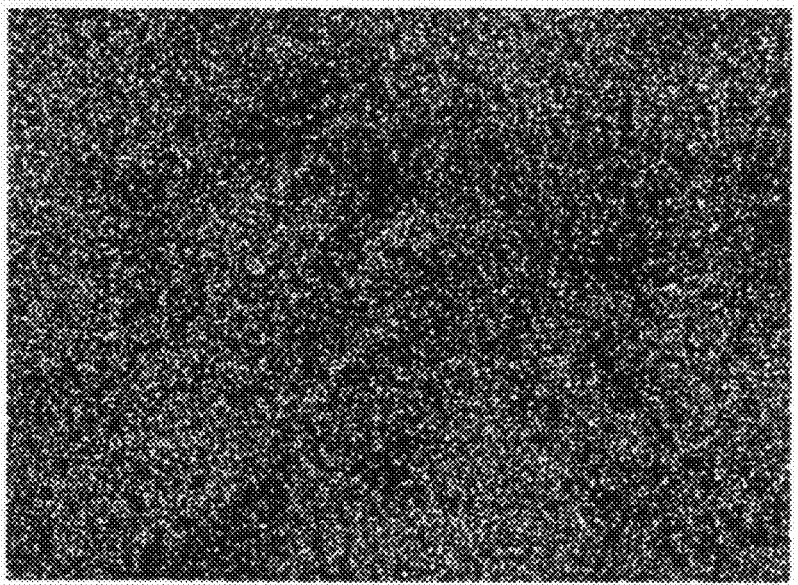
FIG. 12 is a FE-SEM photograph of the aluminum distribution of the reforming catalyst prepared according to Example 1.
Figure 13:
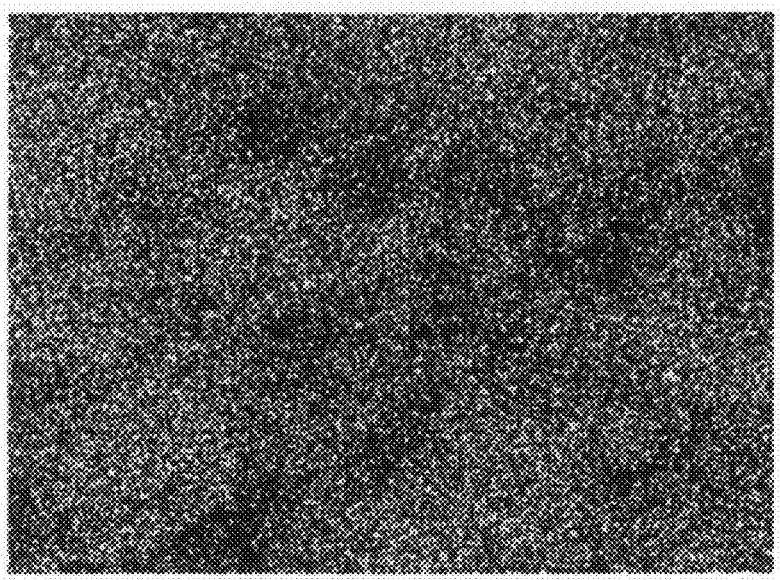
FIG. 13 is a FE-SEM photograph of the oxygen distribution of the reforming catalyst prepared according to Example 1.
Figure 14:
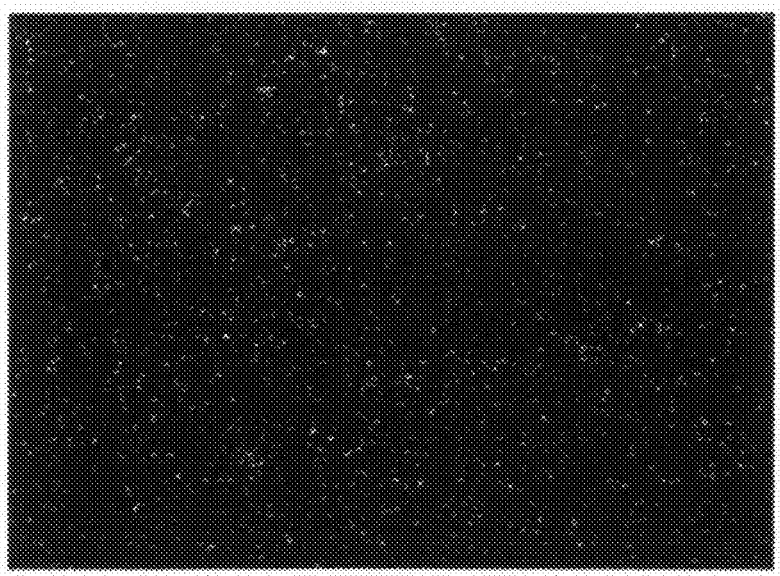
FIG. 14 is a FE-SEM photograph of the sulfur distribution of the reforming catalyst prepared according to Example 1.

FIG. 9 is a scanning electron microscope (FE-SEM) picture of the surface of the reforming catalyst of Example 1. FIG. 10 is a FE-SEM photograph of the platinum distribution of the reforming catalyst of Example 1. FIG. 11 is a FE-SEM photograph of the cerium distribution of the reforming catalyst of Example 1. FIG. 12 is a FE-SEM photograph of the aluminum distribution of the reforming catalyst of Example 1. FIG. 13 is a FE-SEM photograph of the oxygen distribution of the reforming catalyst of Example 1. FIG. 14 is a FE-SEM photograph of the sulfur distribution of the reforming catalyst of Example 1.

Referring to FIGS. 9 to 14, the reforming catalyst of Example 1 included a lot of aluminum and oxygen and had uniform sulfur distribution.

Evaluation of a Carrier Influence in Reforming Catalysts

The following Table 1 lists the performance results of the reforming catalysts prepared according to Example 1 and Comparative Example 2.

TABLE 1

|  | Comparative Example 2 | | | Example 1 | | |
| --- | --- | --- | --- | --- | --- | --- |
| Reactor surface temperature (° C.) | 617 | 721 | 720 | 669 | 620 | 600 |
| Catalyst temperature (° C.) | 601 | 705 | 704 | 652 | 601 | 582 |
| Air temperature (° C.) | 647 | 752 | 740 | 690 | 642 | 622 |
| CO inflow (%) | 9.2 | 14.0 | 14.1 | 12.5 | 6.8 | 5.6 |
| $CO_2$ inflow (%) | 10.2 | 12.0 | 11.3 | 13.4 | 16.8 | 18.3 |
| Methane (%) | 14.1 | 6.0 | 0.9 | 2.9 | 5.0 | 6.2 |
| Hydrogen (%) | 66.5 | 68.0 | 73.7 | 71.1 | 71.4 | 70.0 |
| Flow rate of total released gas (ml/min) | 300 | 322 | 400 | 375 | 375 | 368 |
| Hydrogen yield (%) | 65 | 75 | 98 | 87 | 82 | 77 |
| Sum of carbon (%) | 35.3 | 32 | 26.3 | 28.9 | 28.6 | 30.0 |
| Hydrogen flow rate except CO (ml/min) | 199 | 219 | 295 | 267 | 268 | 257 |
| Hydrogen flow rate including CO (ml/min) | 227 | 264 | 351 | 314 | 293 | 278 |
| Water inflow rate (ml/min liquid) | 0.301 | 0.301 | 0.301 | 0.301 | 0.301 | 0.301 |
| Catalyst filled amount (ml) | 15 | 15 | 15 | 15 | 15 | 15 |
| Space velocity $h^{-1}$ | 1640 | 1640 | 1640 | 1640 | 1640 | 1641 |
| $H_2O/C$ ratio | 3.5 | 3.5 | 3.5 | 3.5 | 3.5 | 3.4 |
| Propane flow rate (ml/min) | 35 | 35 | 35 | 35 | 35 | 36 |

In Table 1, the "sum of carbon (%)" indicates the volume % of $CH_4$, CO, and $CO_2$ out of the produced gas including hydrogen.

The "hydrogen yield" indicates a ratio of $H_2$ flow rate and CO flow rate with respect to the theoretical $H_2$ flow rate. The "hydrogen flow rate except for CO" indicates the pure hydrogen flow rate. The "hydrogen flow rate including CO" indicates the sum of pure hydrogen flow rate and another hydrogen flow rate acquired through the transformation of carbon monoxide in the next step. According to the results shown in Table 1, the fuel included 95 volume % of propane and 5 volume % of butane.

Referring to Table 1, when the evaluation was performed at a low space velocity of 1640 $h^{-1}$, the reforming catalyst of Comparative Example 2 performed worse than Example 1. In other words, the reforming catalyst of Comparative Example 2 had higher methane concentration and low hydrogen yield. The reason for this is that the reactor had a non-active area. Since the reforming catalyst of Comparative Example 2 did not include a carrier, the reactant could not smoothly pass through the catalyst layer.

On the other hand, when the space velocity was 16383 h$^{-1}$, the reforming reaction did not proceed, but carbonization of the reforming catalyst sharply proceeded in the reactor including the reforming catalyst of Comparative Example 2. The reason for this is that the reactant could not pass through the catalyst layer, thereby increasing pressure around the entrance of the reactor.

Performance Comparison of Reforming Catalysts with a Common Reforming Catalyst

A RUA catalyst (from Sud-Chemie Co.) was used as a common reforming catalyst. The RUA catalyst included 2 wt % of Ru in an $Al_2O_3$ carrier. The following Table 2 compares performance of the RUA catalyst to the reforming catalysts prepared according to Examples 1 and 2.

TABLE 2

| | RUA Catalyst | | | | | Example 2 | |
|---|---|---|---|---|---|---|---|
| Reactor surface temperature (° C.) | 738 | 624 | 610 | 608 | 589 | 672 | 620 |
| Catalyst temperature (° C.) | 711 | 615 | 603 | 601 | 582 | 654 | 605 |
| Air temperature (° C.) | 751 | 652 | 632 | 631 | 611 | 696 | 646 |
| CO inflow (%) | 13.9 | 8.2 | 7.7 | 7.8 | 6.6 | 7.9 | 9.2 |
| $CO_2$ inflow (%) | 13.2 | 17.5 | 17.5 | 17.6 | 18.3 | 15.0 | 15.1 |
| Methane (%) | 2.7 | 8.6 | 7.5 | 7.6 | 8.4 | 2.1 | 3.2 |
| Hydrogen (%) | 70.2 | 65.6 | 67.3 | 67.0 | 66.7 | 75.0 | 72.6 |
| Flow rate of total released gas (ml/min) | 368 | 347 | 340 | 340 | 327 | 419 | 402 |
| Hydrogen yield (%) | 86 | 71 | 71 | 71 | 67 | 96 | 91 |
| Sum of carbon (%) | 29.8 | 34.4 | 32.7 | 33.0 | 33.3 | 25.0 | 27.4 |
| Hydrogen flow rate except CO (ml/min) | 258 | 228 | 229 | 228 | 218 | 314 | 292 |
| Hydrogen flow rate including CO (ml/min) | 309 | 256 | 255 | 254 | 240 | 347 | 329 |
| Water inflow rate (ml/min liquid) | 0.301 | 0.301 | 0.301 | 0.301 | 0.301 | 0.301 | 0.301 |
| Catalyst filled amount (ml) | 15 | 15 | 15 | 15 | 15 | 15 | 15 |
| space velocity (h$^{-1}$) | 1640 | 1640 | 1640 | 1640 | 1640 | 1640 | 1640 |
| $H_2O/C$ ratio | 3.5 | 3.5 | 3.5 | 3.5 | 3.5 | 3.5 | 3.5 |
| Propane flow rate (ml/min) | 35 | 35 | 35 | 35 | 35 | 35 | 35 |

| | Example 2 | Example 1 | | | |
|---|---|---|---|---|---|
| Reactor surface temperature (° C.) | 600 | 720 | 669 | 620 | 600 |
| Catalyst temperature (° C.) | 582 | 704 | 652 | 601 | 582 |
| Air temperature (° C.) | 622 | 740 | 690 | 642 | 622 |
| CO inflow (%) | 8.2 | 14.1 | 12.5 | 6.8 | 5.6 |
| $CO_2$ inflow (%) | 15.9 | 11.3 | 13.4 | 16.8 | 18.3 |
| Methane (%) | 5.9 | 0.9 | 2.9 | 5.0 | 6.2 |
| Hydrogen (%) | 70.1 | 73.7 | 71.1 | 71.4 | 70.0 |
| Flow rate of total released gas (ml/min) | 368 | 400 | 375 | 375 | 368 |
| Hydrogen yield (%) | 79 | 98 | 87 | 82 | 77 |
| Sum of carbon (%) | 29.9 | 26.3 | 28.9 | 28.6 | 30.0 |
| Hydrogen flow rate except CO (ml/min) | 258 | 295 | 267 | 268 | 257 |
| Hydrogen flow rate including CO (ml/min) | 288 | 351 | 314 | 293 | 278 |
| Water inflow rate (ml/min liquid) | 0.301 | 0.301 | 0.301 | 0.301 | 0.301 |

TABLE 2-continued

| | | | | | |
|---|---|---|---|---|---|
| Catalyst filled amount (ml) | 15 | 15 | 15 | 15 | 15 |
| space velocity ($h^{-1}$) | 1641 | 1640 | 1640 | 1640 | 1641 |
| $H_2O/C$ ratio | 3.4 | 3.5 | 3.5 | 3.5 | 3.4 |
| Propane flow rate (ml/min) | 36 | 35 | 35 | 35 | 36 |

Referring to Table 2, the "sum of carbon (%)" indicates the volume % of $CH_4$, CO and $CO_2$ out of the produced gas including hydrogen. The "hydrogen yield" indicates a ratio of $H_2$ and CO flow rates with respect to the theoretical $H_2$ flow rate. The "hydrogen flow rate except for CO" indicates the pure hydrogen flow rate. The "hydrogen flow rate including CO" indicates the sum of the pure hydrogen flow rate and another hydrogen flow rate acquired through the transformation of carbon monoxide in the next step. The results in Table 2 show that the fuel included 95 volume % of propane and 5 volume % of butane.

Referring to Table 2, the reforming catalysts of Examples 1 and 2 had high hydrogen yields, therefore they can be used.

Performance Evaluation at a Low Temperature and a Low Space Velocity

Figure 15:
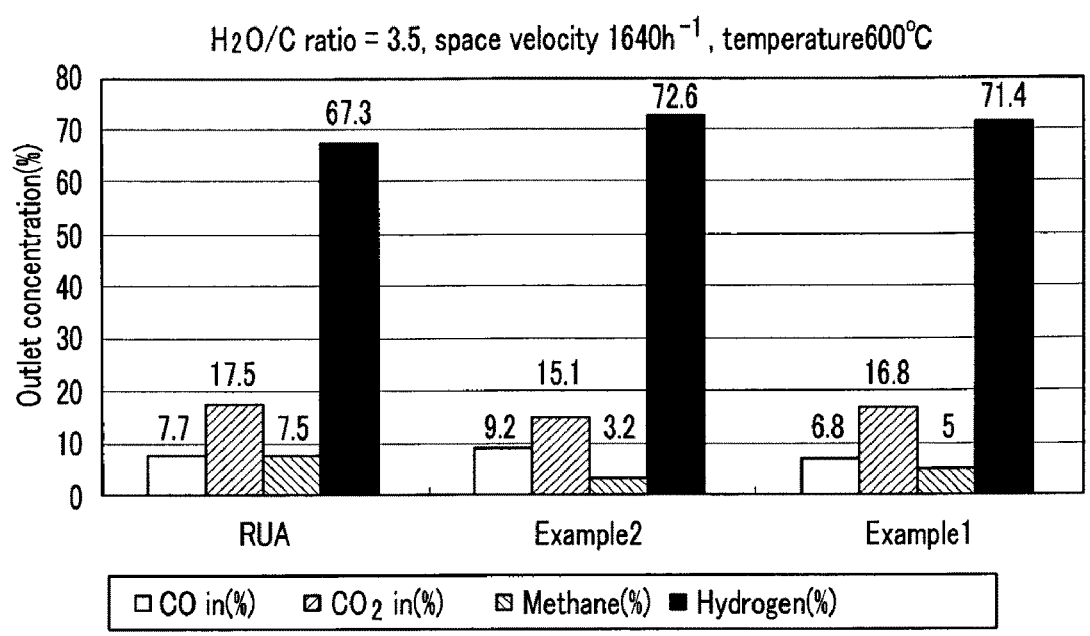
FIGS. 15 and 16 are graphs comparing the reforming reaction results at 600° C. of a RUA catalyst (from Sud-Chemie Inc.) and the reforming catalysts prepared according to Examples 1 and 2.
Figure 16:
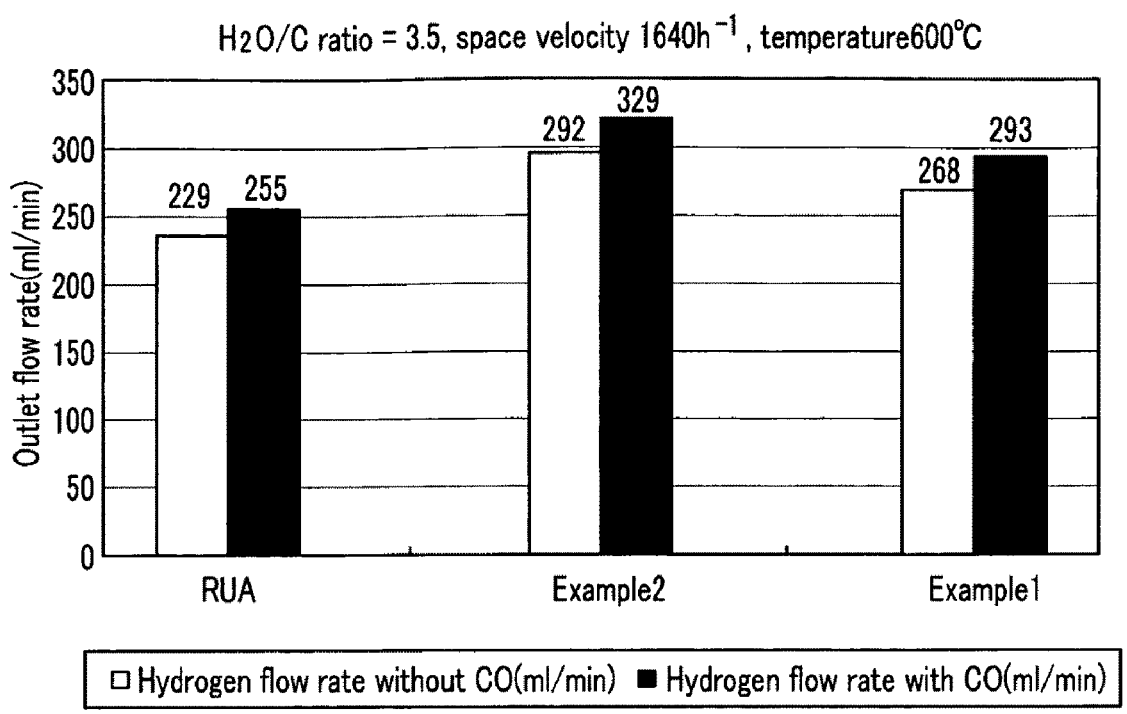

FIGS. 15 and 16 compare the reforming reaction results for the RUA catalyst to the results for the reforming catalysts of Examples 1 and 2 at 600° C., a space velocity of 1640 $h^{-1}$, and a $H_2O/C$ of 3.5. Referring to FIG. 15, the reforming catalyst of Example 2 had the lowest methane concentration and highest hydrogen concentration at 600° C. Referring to FIG. 16, the reforming catalyst of Example 2 also had the largest concentration of released gas at 600° C.

Figure 17:
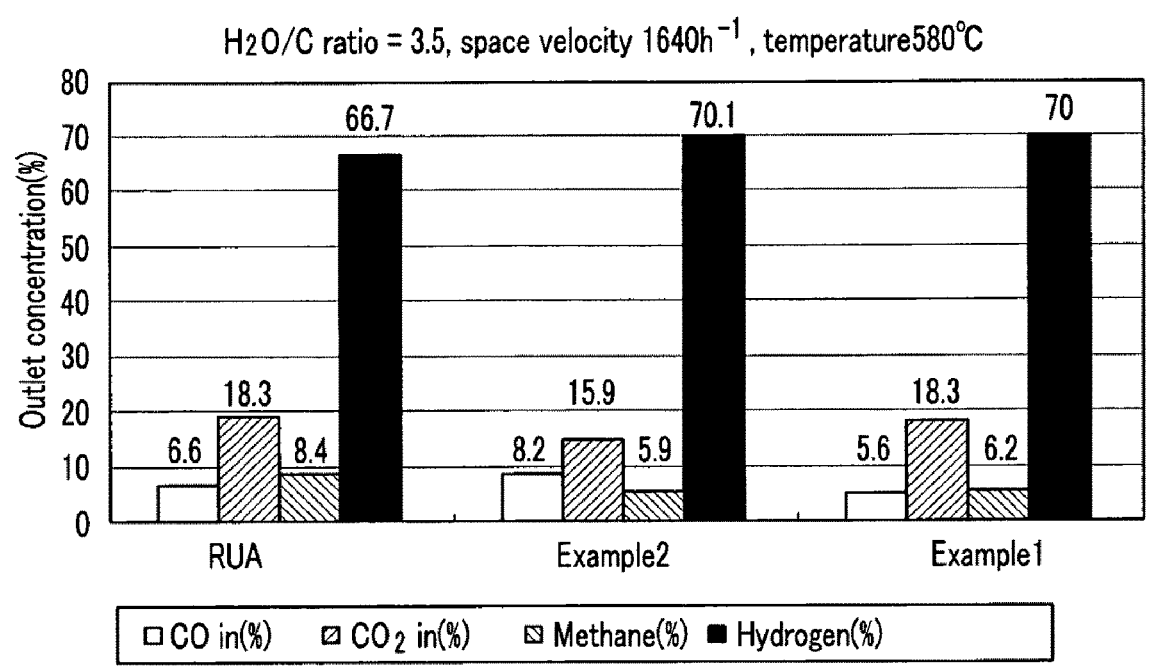
FIGS. 17 and 18 are graphs comparing the reforming reaction results at 580° C. of a RUA catalyst and the reforming catalysts prepared according to Examples 1 and 2.
Figure 18:
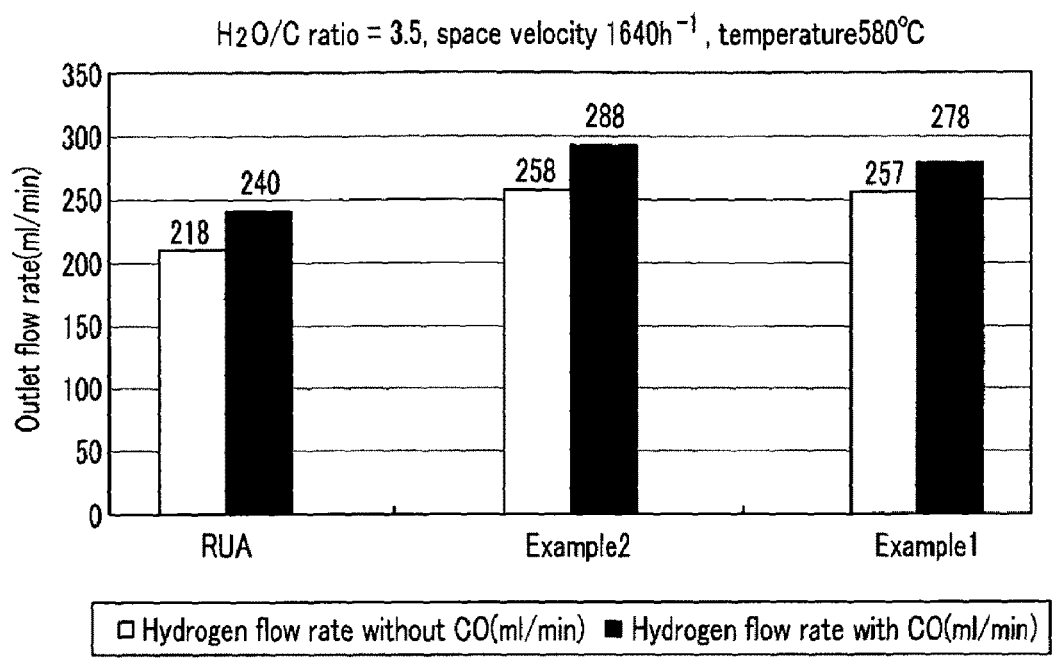

FIGS. 17 and 18 compare the reforming reaction results for the RUA catalyst to the results for the reforming catalysts according to Examples 1 and 2 at a catalyst temperature of 580° C., a space velocity of 1640 $h^{-1}$, and a $H_2O/C$ of 3.5. Referring to FIG. 17, the reforming catalyst of Example 2 had the lowest methane concentration and highest hydrogen concentration at 580° C. Referring to FIG. 18, the reforming catalyst of Example 2 also had the largest concentration of released gas at 580° C.

Figure 19:
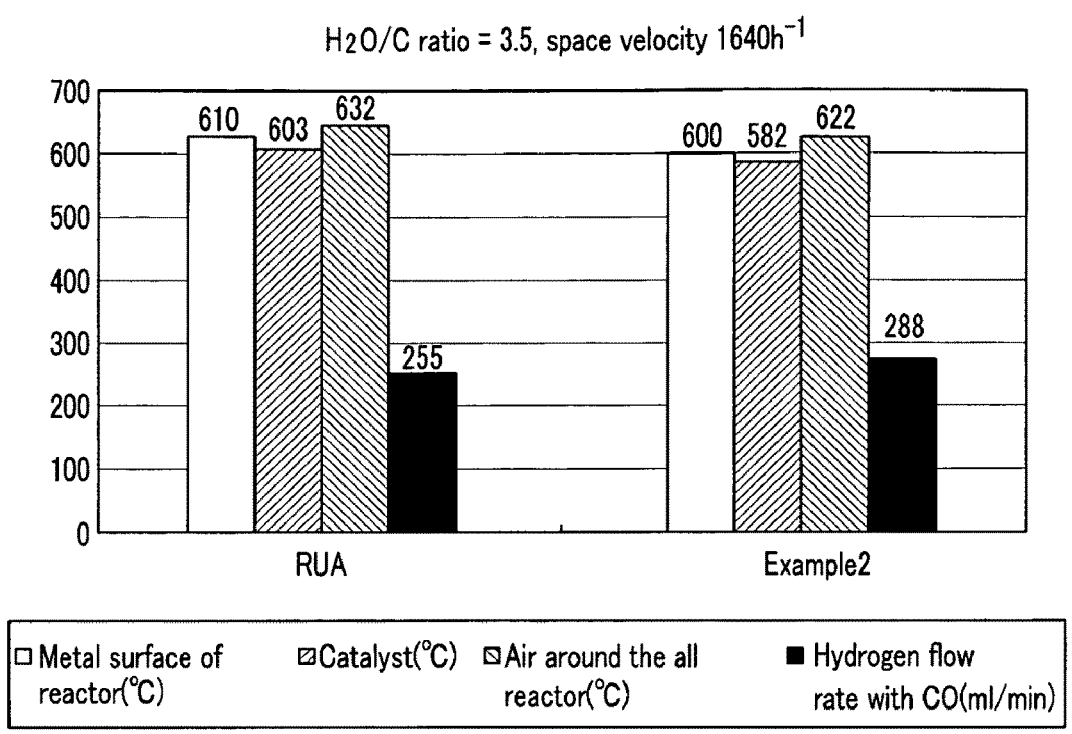
FIG. 19 is a graph comparing the hydrogen flow rate of a RUA catalyst at 603° C. and that of the reforming catalyst prepared according to Example 2 at 582° C.

FIG. 19 shows the hydrogen flow rates of the RUA catalyst at a catalyst temperature of 603° C., a reactor temperature of 610° C., and an air temperature around the reactor of 632° C. Also, FIG. 19 shows the hydrogen flow rates of the catalyst of Example 2 at a catalyst temperature of 582° C., a reactor temperature of 600° C., and an air temperature around the reactor of 622° C. Referring to FIG. 19, the catalyst of Example 2 had better activity for the reforming reaction at the low temperature than the RUA catalyst.

Figure 20:
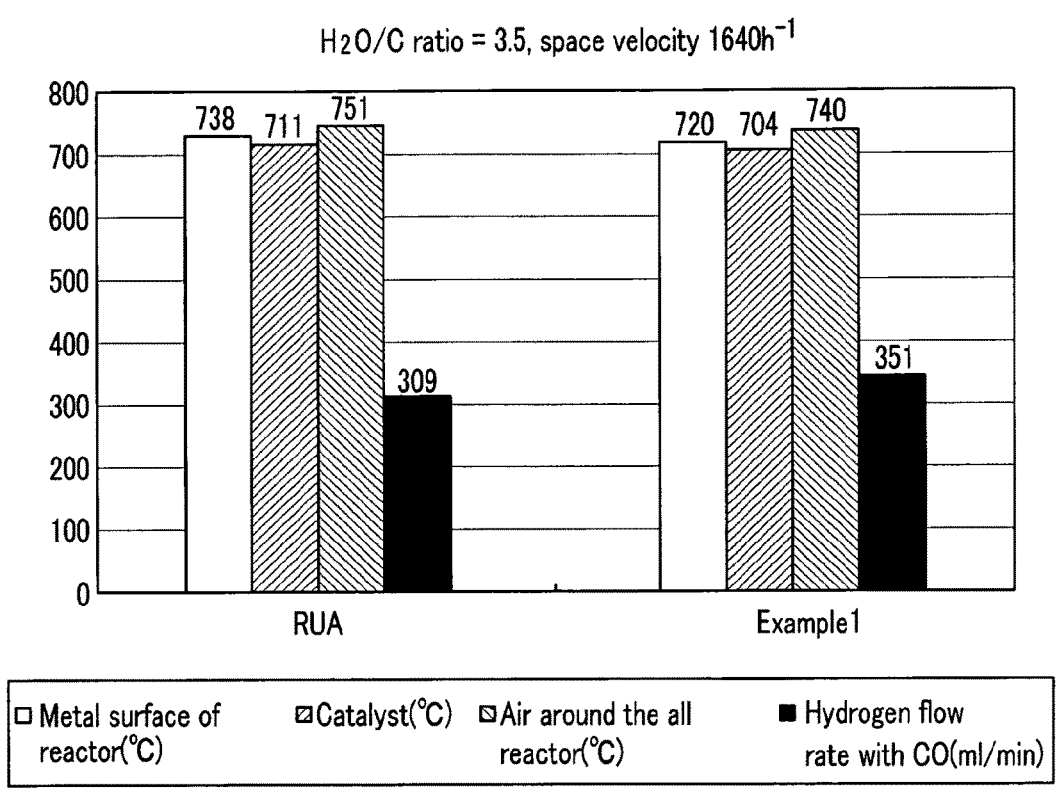
FIG. 20 is a graph comparing the hydrogen flow rate of a RUA catalyst at 711° C. and that of the reforming catalyst prepared according to Example 1 at 704° C.

FIG. 20 shows the hydrogen flow rates of the RUA catalyst at a catalyst temperature of 711° C., a reactor temperature of 738° C., and an air temperature around the reactor of 751° C. Also, FIG. 20 shows the hydrogen flow rates of the catalyst of Example 1 at a catalyst temperature of 704° C., a reactor temperature of 720° C., and an air temperature around the reactor of 740° C. Referring to FIG. 20, the catalyst of Example 1 had better activity for the reforming reaction at the high temperature than that of the RUA catalyst.

Performance Evaluation at High Space Velocity

Figure 21:
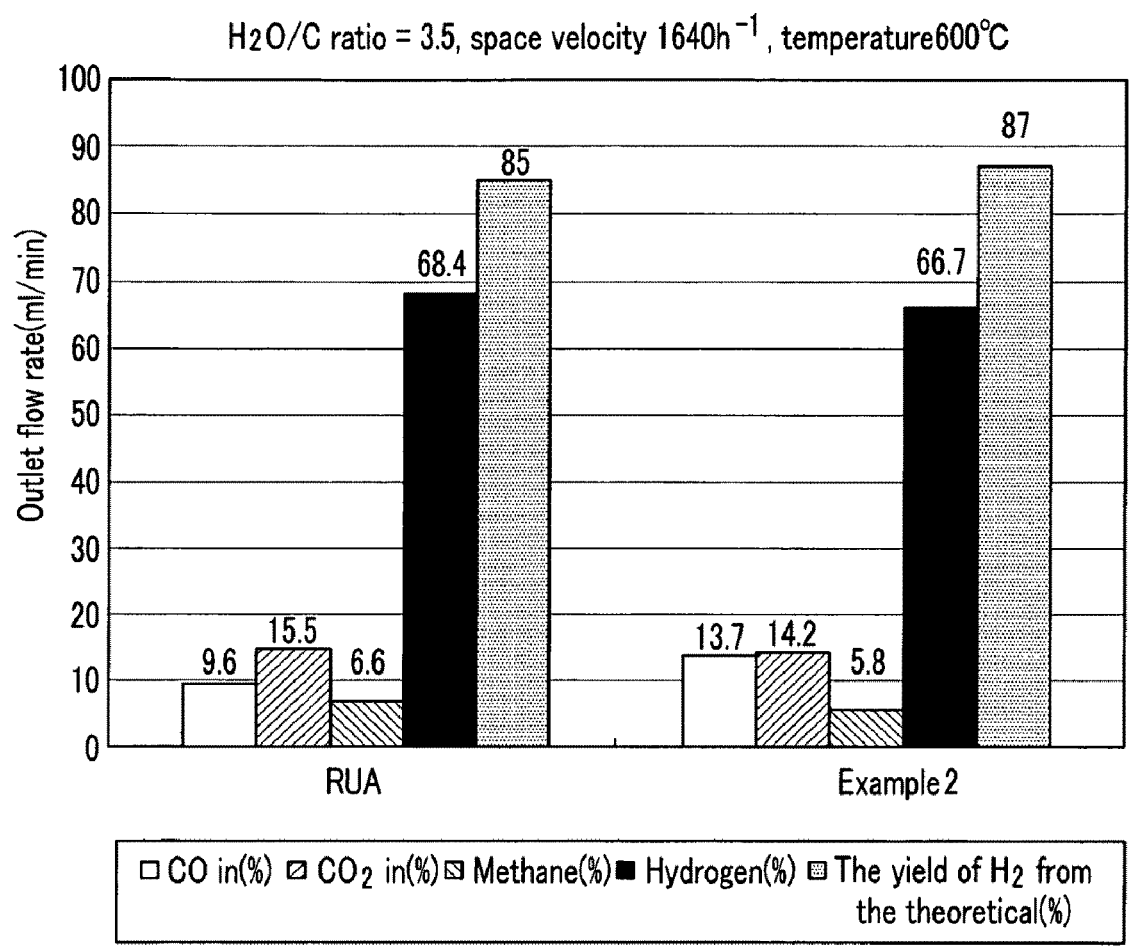
FIG. 21 is a graph comparing the reforming reaction results at a space velocity of 16400 h$^{-1}$ of a RUA catalyst and the reforming catalyst prepared according to Example 2.

Table 3 and FIG. 21 compare the reforming reaction results for the RUA catalyst to the reforming catalyst of Example 2 at a space velocity of 16400 $h^{-1}$ and a $H_2O/C$ of 3.5.

TABLE 3

| | RUA Catalyst | Example 2 | RUA Catalyst | Example 2 | RUA Catalyst | Example 2 |
|---|---|---|---|---|---|---|
| Reactor surface temperature (° C.) | 665 | 667 | 713 | 689 | 720 | 731 |
| Catalyst temperature (° C.) | 580 | 589 | 600 | 600 | 630 | 628 |
| Air temperature (° C.) | 710 | 711 | 748 | 724 | 782 | 765 |
| CO inflow (%) | 14.6 | 14.1 | 9.6 | 13.7 | 9.4 | 14.4 |
| $CO_2$ inflow (%) | 12.6 | 14.5 | 15.5 | 14.2 | 15.9 | 10.0 |
| Methane (%) | 9.2 | 6.6 | 6.6 | 5.8 | 6.0 | 5.8 |
| Hydrogen (%) | 63.6 | 64.8 | 68.4 | 66.3 | 68.7 | 69.8 |
| Flow rate of total released gas (ml/min) | 3000 | 3865 | 3917 | 3881 | 3917 | 3712 |
| Hydrogen yield (%) | 66 | 86 | 85 | 87 | 85 | 88 |
| Sum of carbon (%) | 36.4 | 35.2 | 31.6 | 33.7 | 31.3 | 30.2 |
| Hydrogen flow rate except CO (ml/min) | 1908 | 2503 | 2678 | 2573 | 2692 | 2592 |
| Hydrogen flow rate including CO (ml/min) | 2346 | 3049 | 3054 | 3106. | 3059 | 3128 |
| Water inflow rate (ml/min liquid) | 3.01 | 3.01 | 3.01 | 3.01 | 3.01 | 3.01 |
| Catalyst filled amount (ml) | 15 | 15 | 15 | 15 | 15 | 15 |
| space velocity ($h^{-1}$) | 16393 | 16383 | 16394 | 16383.11 | 16394 | 16383 |
| $H_2O/C$ ratio | 3.5 | 3.5 | 3.5 | 3.5 | 3.5 | 3.5 |
| Propane flow rate (ml/min) | 353 | 350 | 353 | 350 | 353 | 350 |

In Table 3, the "sum of carbon (%)" indicates the volume % of $CH_4$, CO, and $CO_2$ out of the produced gas including hydrogen. The "hydrogen yield" indicates the ratio of $H_2$ and CO flow rates with respect to the theoretical $H_2$ flow rate. The "hydrogen flow rate except for CO" indicates the pure hydrogen flow rate. The "hydrogen flow rate including CO" indicates the sum of the pure hydrogen flow rate and another hydrogen flow rate acquired by the transformation of carbon monoxide in the next step. The results in Table 3 show that the fuel included 95 volume % of propane and 5 volume % of butane.

Referring to Table 3 and FIG. 21, the reforming catalyst of Example 2 had better hydrogen yield at 600° C. than the RUA catalyst.

While the invention has been illustrated and described in connection with certain exemplary embodiment, it is understood by those of ordinary skill in the art that various modification and changes to the described embodiments may be made without departing from the spirit and scope of invention, as defined in the appended claims.

What is claimed is:

1. A fuel cell comprising:
 a reforming catalyst comprising:
  a platinum-group metal;
  an inorganic oxide selected from the group consisting of $CeO_2$, $Pr_6O_{11}$, and combinations thereof;
  at least one strong acid ion selected from the group consisting of sulfuric acid ions, phosphoric acid ions, and combinations thereof, wherein the reforming catalyst comprises about 1 to about 6 wt % of an element derived from the at least one strong acid ion; and
 a carrier.

2. The fuel cell of claim 1, wherein the inorganic oxide is supported on the carrier to provide a supported inorganic oxide, the supported inorganic oxide is surface-treated by the at least one strong acid ion to provide a surface-treated inorganic oxide, and the platinum-group metal is disposed on a surface of the surface-treated inorganic oxide.

3. The fuel cell of claim 1, wherein the carrier is selected from the group consisting of $Al_2O_3$, $TiO_2$, and combinations thereof.

4. The fuel cell of claim 1, wherein the platinum-group metal is selected from the group consisting of Pt, Pd, Ru, Rh, and combinations thereof.

5. The fuel cell of claim 1, wherein the reforming catalyst comprises from about 0.1 to about 5 wt % of the platinum-group metal, from about 4 to about 30 wt % of the inorganic oxide, wherein the carrier makes up the balance of the catalyst.

6. The fuel cell of claim 1, wherein the reforming catalyst comprises from about 2 to about 15 wt % of $CeO_2$ and from about 2 to about 15 wt % of $Pr_6O_{11}$.

7. The fuel cell of claim 6, wherein the $CeO_2$ and the $Pr_6O_{11}$ are included in a weight ratio ranging from about 1:1 to about 6:1.

8. The fuel cell of claim 1, wherein the reforming catalyst further comprises $ZrO_2$.

9. The fuel cell of claim 8, wherein the reforming catalyst comprises from about 2 to about 15 wt % of $ZrO_2$.

* * * * *